United States Patent
Ju et al.

(10) Patent No.: US 11,694,439 B2
(45) Date of Patent: Jul. 4, 2023

(54) SECURING VIRTUAL OBJECTS TRACKED IN AN AUGMENTED REALITY EXPERIENCE BETWEEN MULTIPLE DEVICES

(71) Applicant: PayPal, Inc., San Jose, CA (US)

(72) Inventors: Yona Ju, San Jose, CA (US); Fun-Chen Jou, San Francisco, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 17/717,307

(22) Filed: Apr. 11, 2022

(65) Prior Publication Data

US 2022/0230434 A1    Jul. 21, 2022

Related U.S. Application Data

(63) Continuation of application No. 16/727,806, filed on Dec. 26, 2019, now Pat. No. 11,301,681.

(51) Int. Cl.
*G06V 20/20* (2022.01)
*G06Q 20/08* (2012.01)
*G06T 19/00* (2011.01)

(52) U.S. Cl.
CPC ......... *G06V 20/20* (2022.01); *G06Q 20/0855* (2013.01); *G06T 19/006* (2013.01); *G06T 2219/024* (2013.01)

(58) Field of Classification Search
CPC .. G06V 20/20; G06Q 20/0855; G06T 19/006; G06T 2219/024
See application file for complete search history.

(56) References Cited

U.S. PATENT DOCUMENTS

| 8,312,540 | B1 | 11/2012 | Kahn et al. | |
| 8,961,315 | B1 | 2/2015 | Adogla | |
| 2010/0227675 | A1* | 9/2010 | Luxton | G07F 17/3281 463/25 |
| 2011/0313820 | A1* | 12/2011 | Biewald | G06Q 10/06311 705/7.42 |

(Continued)

OTHER PUBLICATIONS

International Preliminary Report on Patentability for Application No. PCT/US2020/065297 dated Jul. 7, 2022, 13 pages.

(Continued)

*Primary Examiner* — Terrell M Robinson
(74) *Attorney, Agent, or Firm* — Haynes and Boone, LLP

(57) ABSTRACT

There are provided systems and methods for securing virtual objects tracked in an augmented reality experience between multiple devices. A user may capture visual data utilizing a device at a location, where the visual data includes one or more real-world objects. An augmented reality experience may be displayed with the real-world objects, where virtual graphics or other visual indicators are overlaid onto an output of the environment and may be associated with various objects so that the virtual graphics may be seen with the environment. The virtual graphics may further be associated with an amount left by the user for another user, such as a tip or a payment for a service. The other user may be required to complete some task, where the completion of the task may be identified by changes to the real-world objects when the environment is captured by the other user's device.

20 Claims, 6 Drawing Sheets

(56) References Cited

U.S. PATENT DOCUMENTS

| | | |
|---|---|---|
| 2012/0239556 A1 | 9/2012 | Magruder et al. |
| 2013/0297460 A1 | 11/2013 | Spivack |
| 2014/0089195 A1* | 3/2014 | Ward ................. G06Q 20/3223 705/44 |
| 2014/0237578 A1 | 8/2014 | Bryant et al. |
| 2014/0258110 A1* | 9/2014 | Davis ................. G06Q 20/3223 705/26.4 |
| 2016/0364758 A1 | 12/2016 | Achhra et al. |
| 2017/0177608 A1 | 6/2017 | Cismas et al. |
| 2018/0308561 A1 | 10/2018 | Koker et al. |
| 2019/0206130 A1 | 7/2019 | Ericson et al. |
| 2019/0272139 A1 | 9/2019 | Todasco |
| 2020/0042976 A1 | 2/2020 | Barrese et al. |

OTHER PUBLICATIONS

International Application No. PCT/US2020/065297, International Search Report and Written Opinion dated Mar. 8, 2021, 21 pages.

* cited by examiner

US 11,694,439 B2

SECURING VIRTUAL OBJECTS TRACKED IN AN AUGMENTED REALITY EXPERIENCE BETWEEN MULTIPLE DEVICES

CROSS REFERENCE TO RELATED APPLICATIONS

The present application is a continuation application of U.S. patent application Ser. No. 16/727,806, filed Dec. 26, 2019, and is incorporated in reference in its entirety.

TECHNICAL FIELD

The present application generally relates to augmented reality, and more specifically to an augmented reality experience where virtual objects may be placed for redemption of funds by other users.

BACKGROUND

Various types of service providers may provide augmented reality experiences for certain uses, including overlaying graphical objects over real-world images so that additional data may be seen with real-world images. This augmented reality experience may allow users to play games, interact with other users in a virtual environment, and perform other actions. Additionally, these service providers may provide other services to users, including electronic transaction processing to users. However, virtual objects placed in an augmented reality experience may be viewed and seen by anyone that captures a real-world scene of an environment through a device. Thus, if a first user may want to tie the virtual object to a second user, for example, where the virtual object may be redeemable for value, the augmented reality experience may not have a secure manner to prevent others from viewing and/or accessing the virtual object.

Figure 1:
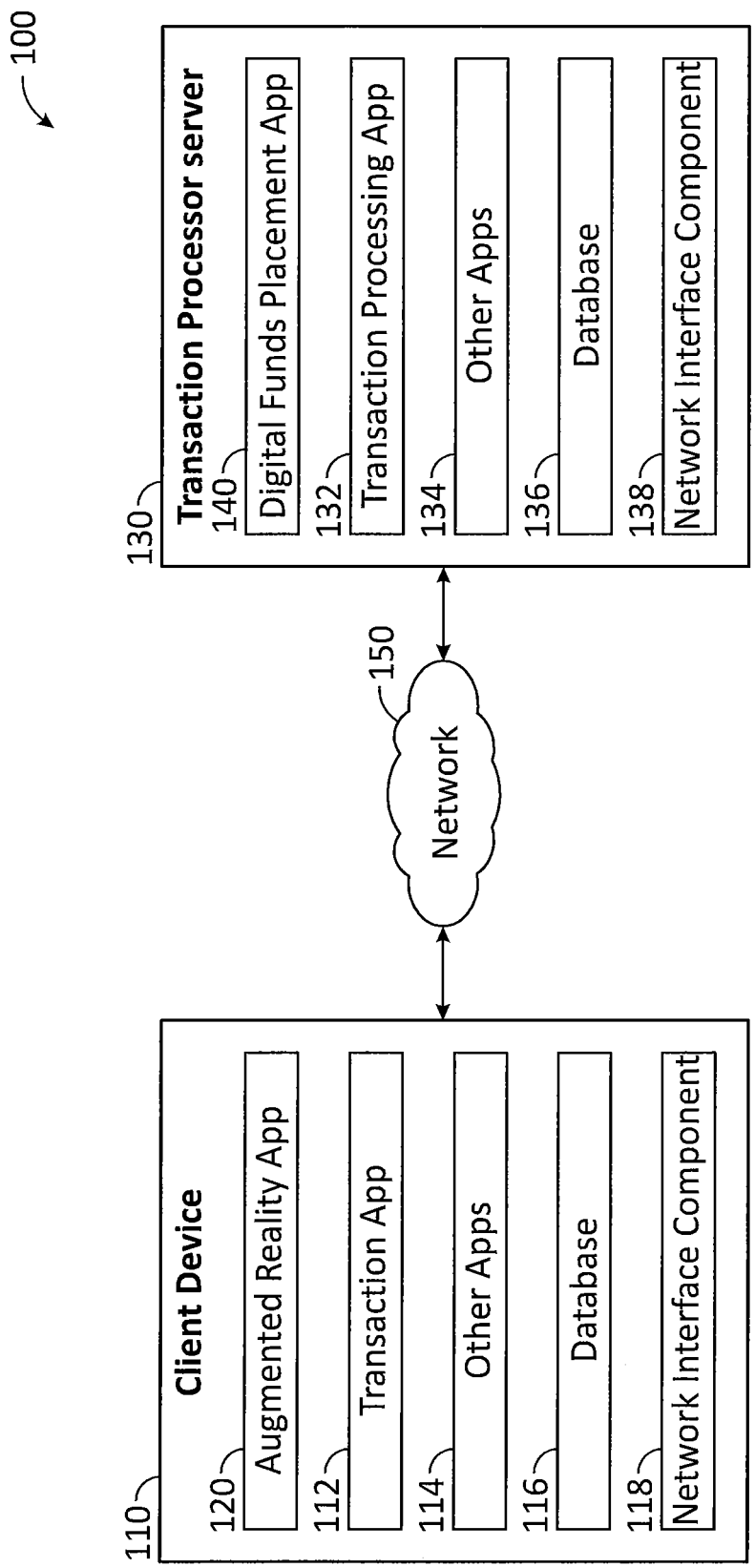
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for securing virtual objects tracked in an augmented reality experience between multiple devices. Systems suitable for practicing methods of the present disclosure are also provided.

According to various embodiments, a user may utilize a communication device in a real-world environment to capture images, including video or three-dimensional scans of real-world objects and environments. The user may view real-world objects, which may include static or moveable objects and may also be used, changed, or otherwise manipulated within the environment. The user may capture the real-world object through an augmented reality experience, scene, or environment that records real-world images of a real-world environment, displays those images, and overlays graphics onto the images so that virtual graphics, objects, icons, or other information may be displayed with, over, next to, and/or associated with the real-world objects. For example, an augmented reality experience may be experienced by multiple users through different devices based on captured real-world images, video, or scans with various visual indicators, graphical objects, and other virtual data. The augmented reality experience therefore combines virtual and real images and indicators to create a scene that allows for virtual objects to be seen with corresponding real-world objects, as well as interact with that scene.

When viewing the augmented reality experience on a device, a user may wish to tag a real-world object or area within the real-world environment with a virtual graphic. The virtual graphic may further be associated with funds, such as an amount that the user would like to place in the augmented reality experience for another user. The first user may input data for the amount of funds and the funds may be attached to the object or area within the augmented reality experience so that other users can view the virtual graphic and redeem or request the funds from the first user. The funds may be associated with an object through an identifying characteristic of the object and/or real-world environment. Further, the first user may require that the second user redeeming the funds from the virtual object complete a task or some work. The task may correspond to a change of the object and/or real-world environment, such as placing an object for delivery, picking up an object for delivery, cleaning a room or making a bed (e.g., at a hotel), or another task where completion of the task can be determined. A service provider may generate a virtual graphic or graphic for the augmented reality experience. This may be stored with the identifying characteristic so that when the object is again identified in the augmented reality experience by the user's device or another user's device, the graphic may then be displayed to the second user. When capturing the object and determining the virtual graphic as well as corresponding funds, the service provider and/or second user's device may determine whether the task has been completed and/or if the second user is authorized to receive the funds. This may include determining an identity of the second user and/or authenticating the second user, and well as monitoring the real-world environment for changes that correspond to the task. Thus, a service provider may provide output of a dynamically generated and displayed augmented reality experience, which allows specific data to be tracked with an object so that multiple disparate users may see the data.

In order to place funds using virtual graphics in an augmented reality experience, as well as redeem those virtual graphics for the funds, a user may create an account with a service provider. The user may be required to provide personal or other identification information to establish the account, such as a name, address, and/or other information. The user may also be required to provide financial information, including payment cards (e.g., credit/debit cards), bank account information, gift cards, and/or benefits/incentives, which may be utilized to provide payments or otherwise engage in processing of another transaction. In order to create an account, the user may be required to select an account name and/or provide authentication credentials, such as a password, personal identification number (PIN), security questions, and/or other authentication information. The service provider may utilize such information to create the account for the user and provide the user with a digital wallet to the user that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted. The account may also include a device identifier or other contact information for the user so that the user may be contacted to complete a transaction for an item tagged in an augmented reality.

Once an account is created, the account may be accessed through a web browser from a website of the service provider and/or a dedicated application of the service provider, such as a mobile smart phone application. The application (or website) may be associated with a payment provider, such as PayPal® or other online payment provider service, which may provide payment services. The application may execute on the computing device for a user and may provide various functionalities and processes to the user. For example, a user may utilize the account through the website or a device application that allows for placement of virtual objects for a payment amount or other funds within an augmented reality experience, where the virtual objects allow for redemption of retrieval of those funds by one or more other users (e.g., a designated user to receive funds, which may be a single user or group of users). In this regard, the user may utilize a communication device to capture visual content or other data including a representation of one or more items. Image, video, or other audiovisual data at a real-world location may capture a representation of an item as an object within a real-world environment. The user's communication device may include a camera, microphone, or other input device that may be used to capture visual data of a real-world scene that includes the item or other object, such as an image or video of the object as well as other nearby objects in the real-world environment. In order to identify object within the environment, various visual data captured by the camera of the device may be used. Within an image or video of the real-world environment, the representations, locations, and visual data of object may be used to determine identifying characteristics, marks, or other data of the object that identifies real-world object and allows for placing a virtual object in the real-world environment.

For example, the video or other image data may be required to be processed to determine and/or recognize the object. Visual data (e.g., images and/or videos, including three-dimensional scans) capturing one or more objects may be processed to recognize the real-world objects or locations within visual data. This may include identifying the environment, such as through characteristics of the environment (e.g., placement of objects, such as furniture, decorations, items, or other data in the environment). This may also include determining which object of location in the environment is selected by the user when the user is viewing the augmented reality experience of the real-world environment through a device. However, the user may not be required to select a specific location within an environment for placement of the virtual object but may instead more generally specify that the virtual object is placed within and associated with a scene. One or more image processing techniques and recognition algorithms may be utilized to determine an object within visual data, including object recognition. The object of interest to a user may be designated with physical cues, such as pointing to an object or location within the environment. Thus, the augmented reality scene may also include the user placing the virtual object or may include some identification of the object through the device or another visual cue. Other data may be used to identify the environment and/or items, for example, audio data, including verbal statements, may identify the item and/or the environment or other data necessary to identify the item.

An image processing and/or object recognition process may be used to identify the environment and/or object for placement of the virtual object for funds. This may be done through comparison of the captured data to other images/video and/or analysis of the data using known item features, landmarks, or other signifying data points. For example, object feature data may be extracted, which may include distances between signifying points or points of interest in the visual data. Depth or width of these signifying points or image landmarks may be extracted, as well as a size relative to other features in the visual data. Other data points may also be determined in the visual data, which may include other features of note. For example, particular objects may have an identifying characteristic or mark, such as a scratch or license plate on a vehicle, a color, numbers or letters on the object, and other identifying content. An environment may be identified through objects within the environment. For example, a restroom at a hotel, restaurant, or club may be identified by placement of sinks and/or items in the restroom. A hotel room, house, or apartment may be identified through furniture, decorations, and other objects within that environment.

Some of these objects may be changeable or manipulated by other users when visiting the environment, such as a bed that may be made, a room that requires cleaning, and the like. This may be used to designate a task for completion and monitor the completion of the task to release the funds to the second user. In some embodiments, the objects in an environment are identified using wording on the object, a logo or tag, a barcode or QR code, a location relative to other objects, or other data including a color of the item, environmental information in the visual data, contrast and/or lighting in the visual data, and other context related data for the visual data. Thus, computer algorithms, image processing techniques, and/or machine learning processes may be utilized to determine and identify an item in visual data captured by the first user. Thus, the identifying characteristic may include further data than just an object shape or scan, which may be used to more specifically determine the particular object. The information in the visual data that may be used to determine a corresponding object may include text within the image, color, contrast, lighting, geographic location, time of capture of the visual data, audio within the visual data, or other data within the visual data or associated with the visual data, such as metadata. In this regard, different items may be sold in different flavors, types, brands, or other versions in specific locations, which may be detected based on color, description on packaging, geographic location, or other information.

Additionally, the visual data may be accompanied by metadata that may be used by the service provider to identify the environment or object in the environment for placement of a virtual object for funds. For example, the device capturing visual data at a location may determine a location of the user, device, and/or object through a GPS module or locator associated with the device. This may be appended to the visual data as metadata, which may be transmitted to the service provider with the visual data. In some embodiments, the metadata may include a timestamp of when the visual data is captured. The timestamp may be used to determine whether another user is authorized to retrieve the funds for a visual object, for example, by making the funds available only to nearby users or for a period of time through the virtual object. This may be based on a score, risk, or other probability model that the second user retrieving the funds from the virtual object is the authorized user to receive those funds. The probability may be determined through a machine learning model utilizing other known data of the first user placing the funds through the virtual object and/or the second user attempting to retrieve those funds, such as device or user identifiers, applications on the users' respective devices, data on those devices, past transaction histories including associations between the users (e.g., co-locations, funds paid between the user, a company of the users, etc.). Additionally, a task may be required to be completed to release the funds.

Once the object and/or environment in the captured data is determined, the service provider may receive a request to attach an amount of funds to an object and/or environment through a virtual object visible in an augmented reality experience. For example, the user may utilize their device to select the object within an augmented reality experience (or the environment in general), where the object is then identified, and the user may provide an amount to attach to the object through a virtual graphic or other visual indicator in an augmented reality experience. The additional input may correspond to an amount, as well as a description of the amount and/or task that is required to receive the amount through the augmented reality experience. Additionally, the input may include a contact identifier, such as a phone number, messenger name, or other data that identifies the first user placing the amount to one or more other users including a second user authorized to receive the amount of funds. The input may also include a selection of a particular virtual graphic, such as a box, speech bubble, highlighting, or other graphical object that can be overlaid on an image of the real object in further images of real-world environment of the real object so that other users can view the offer. Additionally, the first user may designate a task to complete, such as cleaning a room, dropping off or picking up a package for delivery, or another task that may change the layout of the environment or the object. The designation of the task may include a desired appearance or state of the environment or object that is required to be changed to from the current state. This may include a before and after image of the environment/object or may correspond to changes that are required to be seen in the real-world environment, which may be determined by the service provider through object recognition and image analysis.

Using this input, the service provider may then generate an item/object-specific visual indicator, change, or modification of the real object or environment for use with the augmented reality experience. The virtual graphic for the augmented reality experience may correspond to a visual change of the display or output within the augmented reality experience. The visual indicator or modification of the object may correspond to a graphic object overlaid onto the object and may adjust output parameters for the item, such as pixels, resolution, size, brightness settings, color gradient, etc. For example, the indicator or modification may be done by one or more of highlighting, adjusting a color gradient, adjusting a brightness of the item, or adding some graphic to views of the environment and/or object in an augmented reality experience. The indicator may also correspond to text overlaid onto the visual data of the environment and/or object. Thus, a visual indicator may be displayed as a graphic overlaid onto the representation of the environment, such as a highlight of a real-world object or item, a box around the item, a pointer to the item, or other information. A modification may also be displayed by modifying display values for the representation. The visual indicator or modification may also be selectable and may be interacted with through one or more input device of the communication device, for example, to pull up information about the funds, the user providing the funds, and/or the required task to complete for release of the funds. Funds may be taken from the first user's account and placed in a holding account, escrow account, or other earmarked account so that the funds can be released to the second user.

Once the augmented reality experience is updated to have the generated virtual graphic, visual indicator, or other virtual object, the augmented reality experience may be output to one or more other users through their respective devices. The user may interact with the augmented reality experience to view particular data for the offer, as well as respond to the offer. In order to place the virtual graphic within the augmented reality experience on multiple devices, the identifying characteristic(s) of the object and/or environment may be used with an object recognition system to detect the environment for the virtual graphic. For example, an identifying mark (e.g., physical marking on an object in an environment) may be used to identify the object. In addition, a geo-location may be used to identify a particular environment and/or object that is being captured in the augmented reality experience. A timestamp of when the virtual graphic for the funds was placed may be used to determine whether virtual graphic should be placed in the augmented reality experience, has expired, or is for a different user. For example, if a user places funds in an augmented reality environment through a virtual graphic that is meant for a housecleaner to pick up in 30 minutes or at 4:00 PM, if the real-world environment for the funds is captured by another device outside of this time, the virtual graphic may not be displayed. However, if within this time (or in close proximity to the time), then the virtual graphic may be displayed. If the object is identified and matched, the virtual graphic or graphic for the offer may be displayed in the augmented reality experience on the second device of the second user. Thus, the virtual graphic may be displayed based one or more of identifying marks or objects in a real-world scene, geo-locations of the devices capturing the scene and the geo-location of the previously placed funds, and/or time of placement of those funds in the augmented reality experience.

In various embodiments, a device of the second user may correspond to a wearable computing device, mobile device, or other device having a camera and viewfinder, which may present the indicators or other data in the augmented reality experience. For example, wearable eyeglasses with associated computing devices may present the augmented reality experience when the second user is viewing or in an environment corresponding to the item. In other embodiments, the output data may be displayed when the second user is viewing the environment for placed funds in the augmented reality experience through an application executing on a device, which may be overlaid in the website or application interface presented through the device interface. The second user may then interact with the virtual object for the funds, such as by viewing information including an amount of funds and contact identifier of the first user, contacting the first user, and/or reviewing task details for a task to complete.

Additionally, in order to release the funds, authentication of the second user as being an authorized user to release the funds and/or determination of completion of the task for the funds may be required. In order to perform these steps, an identity of the second user may be determined. This may be done using a device identifier for the second user and/or user information stored on the second user's device. In some embodiments, the second user may login to an account and authenticate their identity when viewing the virtual object in the augmented reality experience. Other processes may be used to verify that the second user can receive the funds. For example, a proximity between the users may be required and/or a time between placement of the funds by the first user and a request for redemption of the funds by the second user may be used. In this regard, the second user may be required to be co-located with the first user (e.g., customers and service people) or the second user may be required to be located in the same location (e.g., a cleaning person after a hotel guest leaves a room) soon after placement of the funds. The second user's information may also include employment information that may link the second user to the geo-location of the funds. An image of the second user may also be used to determine the employment information or a name of the second user (e.g., through image matching or identifying a name on a shirt or tag of the second user). Thus, the virtual object may be tied to a specific name, company, organization, or location that allows for identification of the second user as the authorized user to receive the funds. In some embodiments, a social graph or social score between the first user and the second user may be used to determine if the second user is authorized to receive the funds, such as based on a link between the first and second users on or with a social networking platform, messaging, or the like.

A task may also be required to be completed by the second user prior to releasing the funds. The task completion may be detected through image recognition and the required end state of the environment after the task is completed. The task may correspond to a cleaning task, such as cleaning, reorganizing, or otherwise changing a room (e.g., house, apartment, hotel, etc.). To release the funds, it may require making of a bed, cleaning some object, or otherwise changing the real-world environment is some detectable manner. In some embodiments, the task to be completed may correspond to a delivery, either a pick-up or drop-off of an item. Thus, when imaging the real-world environment, the item may be required to be taken or placed at the location in order for the funds to be released. Other types of tasks may also be completed that alter the real-world environment in a manner that may be detected through the augmented reality experience so as to release funds placed in that environment for the task. If the task is not completed or the second user completes the task after an authorized amount of time, such as a validity period of the virtual object for the funds, then the funds may be reverted to the first user's account In this regard, an augmented reality experience may be generated that provides virtual objects allowing users to leave funds connected to a location, environment or object. Using object recognition and image processing for the augmented reality experience allows virtual funds to be left so that a user is not required to hold physical funds and/or be present when providing funds, such as a tip to another user. Additionally, the augmented reality experience may be used to track objects and environments through identifying characteristics so that the virtual objects may be presented on other devices without requiring specific input by other users. This allows for automated generation of the augmented reality experience on other devices and allows for other users to redeem the placed funds in a fast manner. Further, by using processes to authenticate the user and detect whether a task has been completed through image recognition processes, the funds may also be securely placed to prevent theft or misappropriation by other parties.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a client device 110 and a transaction processor server 130 in communication over a network 150. A user (not shown) may utilize client device 110 to utilize the various features available for client device 110, which may include processes and/or applications associated with transaction processor server 130 to view an augmented reality experience provided by one or more augmented reality applications and place digital funds in the augmented reality experience tied to a location or object so that the funds may be retrieved by another user. The user may utilize client device 110 to capture real-world visual data, where client device 110 displays the augmented reality experience. The user may then request that digital funds be placed in the environment for redemption by another user. A virtual graphic or other virtual visual indicator may then be stored with one or more identifying characteristics of the environments so that other devices capturing the augmented reality experience may then view the virtual graphic with the real-world object through the augmented reality experience. This may allow another user to request the digital funds if that user is authorized.

Client device 110 and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with transaction processor server 130. For example, in one embodiment, client device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Client device 110 of FIG. 1 contains an augmented reality application 120, transaction application 112, other applications 114, a database 116, and a network interface component 118. Augmented reality application 120, transaction application 112, and other applications 114 may correspond to executable processes, procedures, and/or applications with associated hardware. In other embodiments, client device 110 may include additional or different modules having specialized hardware and/or software as required.

Augmented reality application 120 may correspond to one or more processes to execute software modules and associated devices of client device 110 to receive or record visual data and process the visual data to provide an augmented reality scene or video, including placement of digital funds or a payment in the augmented reality experience and redeem such funds. In this regard, augmented reality application 120 may correspond to specialized hardware and/or software utilized by a user of client device 110 that first receives, captures, and/or records video data, including audiovisual data that includes audio data that may also be processed to determine item identifications in the environment. Augmented reality application 120 may utilize a camera or other optical/visual data capturing device of client device 110. For example, the visual data capture device may correspond to at least on optical or visual capture device of client device 110 enabling a user associated with client device 110 to capture or record images, including still and/or video images. Input devices may correspond to a digital camera on client device 110 (e.g., incorporated in client device 110 such as a mobile phone's digital camera in a traditional camera orientation and/or a forward facing camera orientation that captures one or more users as they use and view a display screen of client device 110) or associated with client device 110 (e.g., connected to client device 110 but incorporated within a body or structure of client device 110), or may more generally correspond to any device capable of capturing or recording an image, video, or other digital media data.

As a digital camera, input devices may include a sensor array disposed on a semiconductor substrate having a plurality of photosensitive elements configured to detect incoming light. In other embodiments, other types of electromagnetic radiation sensors may be used, including infrared sensitive sensors/elements and the like. A camera of input devices may include various features, such as zoom, flash, focus correction, shutter speed controls, or other various features usable to capture one or more images or videos of the user and/or other users or objects. Input devices may include other media capture components, including a microphone to capture audio data. Input devices may further display a preview and/or captured image to the user through another device of client device 110, such as a viewfinder, screen (e.g., mobile phone touch screen, tablet touch screen, and/or personal computer monitor), or other display. Input devices may interface with one or more applications of client device 110 to capture visual media data, such as images/videos, and may output an augmented reality of the captured visual media data to provide budgetary recommendations and alterations of item appearances in the visual data based on the budgetary recommendations.

The captured visual data may include real-world content, which may include a visual representation of one or more real-world objects. Object identification may be determined through received the visual data for one or more objects in an environment in image or video data that provides contextual data allowing for identification of the object. For example, augmented reality application 120 may allow a user to select a portion of an image of video to highlight an object or select the object for interacting with in an augmented reality experience including the visual data of the real-world and virtual graphics or visual indicators added by augmented reality application and/or transaction processor server 130. Once the object and/or environment has been captured and selected for interaction, augmented reality application 120 provides the data to transaction processor server 130 for determination of an identifying characteristic of the object and/or environment, which may be used to place and link digital funds to a location and augmented reality environment or object in that environment. However, augmented reality application 120 may also provide the determination of the characteristic, which may include allowing a user to select the characteristic and/or provide input of a mark on the object. In some embodiments, the identifying characteristic may correspond to a geo-location, a time of capture of the visual data and object, and/or a specific mark or identification parameter of the object.

Additionally, with the visual data, the user of client device 110 may provide an amount of funds for placement in the augmented reality environment, where another user viewing that environment may request to redeem the funds. Transaction processor server 130 may then generate a virtual graphic or other visual indicator that may be associated with the environment based on the identifying characteristic and funds. For example, the virtual graphic may correspond to a graphical image, object, icon, or other displayable information that may be overlaid over real-world images or video in the augmented reality experience provided by augmented reality application 120. This may also include a graphical overlay and/or a modification of image/video parameters for the item. The visual indicator or other virtual graphic may correspond to highlighting, adding text, or placing another graphic on or near the item's visual representation, and/or may include adjusting pixels, resolution, size, brightness settings, color gradient, or other image/video parameter. For example, the indicator may be done by one or more of highlighting the item, adjusting a color gradient of the item, or adjusting a brightness of the item in the image, or may include overlaying other images or graphics onto the item.

Augmented reality application 120 may also be used to view other objects and previously established virtual graphics and/or indicators through an augmented reality experience. For example, augmented reality application 120 may capture a different scene having one or more virtual graphics for digital funds that may be redeemable. Using the identifying characteristic, augmented reality application 120 and/or transaction processor server 130 may determine the digital funds and whether the user of client device 110 is authorized to receive the funds. Thus, the captured audio and/or visual data by augmented reality application 120 may be used to determine an augmented reality experience for the real-world scene, where the visual indicators are displayed as graphics by augmented reality application 120 overlaid or modifying the visual output of the displayed environment. In this regard, augmented reality application 120 may further allow the user to place or redeem funds from the augmented reality experience using transaction application 112.

Transaction application 112 may correspond to one or more processes to execute software modules and associated devices of client device 110 to provide electronic transaction processing, including placing digital funds in an environment captured through an augmented reality experience. In this regard, augmented reality application 120 may correspond to specialized hardware and/or software utilized by a user of client device 110 that provides transaction processing services, for example, through one or more processes that provide an interface to permit the user to enter input and other data for transaction information, for example, through an input device (e.g., touch screen with a graphical user interface, keypad/keyboard, mouse, etc.) and/or through a data capture device (e.g., camera, other optical device, etc.). Such information may be used to alter or process data from an augmented reality scene provided by augmented reality application 120 that has real-world visual data, for example, by adding account data and/or a contact identifier for an account, user, or client device 110 and/or by utilizing an account to place.

During virtual graphic generation and/or transaction processing, transaction application 112 may be utilized to select payment instrument(s) for use when placing funds in an augmented reality environment and/or redeeming funds from a virtual graphic. As discussed herein, transaction application 112 may utilize user financial information, such as credit card data, bank account data, or other funding source data, as a payment instrument when providing payment information, including an account with transaction processor server 130. For example, transaction application 112 may utilize a digital wallet associated with an account with a payment provider, such as transaction processor server 130, as the payment instrument, for example, through accessing a digital wallet or account of a user with transaction processor server 130 through entry of authentication credentials and/or by providing a data token that allows for processing using the account. Transaction application 112 may also be used to receive a receipt or other information based on placing or redeeming funds with the augmented reality experience.

In some embodiments, one or more of the processes of augmented reality application 120 and transaction application 112 may be provided within the same application so as to provide their services through a single application.

In various embodiments, client device 110 includes other applications 114 as may be desired in particular embodiments to provide features to client device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for client device 110 and provide the location for a particular object, scene, or other data associated with an augmented reality experience. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of client device 110, such as display devices capable of displaying information to users and other output devices, including speakers, which may display an augmented reality to a user.

Client device 110 may further include database 116 stored in a transitory and/or non-transitory memory of client device 110, which may store various applications and data and be utilized during execution of various modules of client device 110. Thus, database 116 may include, for example, identifiers such as operating system registry entries, cookies associated with augmented reality application 120 and/or transaction application 112, identifiers associated with hardware of client device 110, or other appropriate identifiers, such as identifiers used for payment/user/device authentication or identification, which may be communicated as identifying client device 110 to transaction processor server 130. In various embodiments, database 116 may store real-world images and/or virtual graphics or indicators for an augmented reality experience, as well as information about funds placed within an augmented reality experience.

Client device 110 includes at least one network interface component 118 adapted to communicate with transaction processor server 130 and/or another device or server for electronic transaction processing. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices. In some embodiments, communication device 110 may also communicate directly with nearby devices (e.g., merchant device 130) using short range communications, such as Bluetooth Low Energy, LTE Direct, WiFi, radio frequency, infrared, Bluetooth, and near field communications.

Transaction processor server 130 may be maintained, for example, by an online service provider, which may provide transaction processing and payment services, as well as augmented reality services for placing funds within an augmented reality environment so that other users may retrieve those funds. In this regard, transaction processor server 130 includes one or more processing applications which may be configured to interact with client device 110, and/or another device/server to facilitate an augmented reality experience for object purchasing. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users.

Transaction processor server 130 of FIG. 1 includes a digital funds placement application 140, a transaction processing application 132, other applications 134, a database 136, and a network interface component 138. Digital funds placement application 140, a transaction processing application 132, and other applications 134 may correspond to executable processes, procedures, and/or applications with associated hardware. In other embodiments, transaction processor server 130 may include additional or different modules having specialized hardware and/or software as required.

Digital funds placement application 140 may correspond to one or more processes to execute software modules and associated specialized hardware of transaction processor server 130 to provide place of digital funds with real-world objects or environments so that a virtual graphic, text, and/or visual indicator may be presented in an augmented reality experience that allows for retrieval of those funds by other users. In this regard, digital funds placement application 140 may correspond to specialized hardware and/or software to first receive visual data of a real-world environment, for example, as client device 110 captures a scene through a camera and augmented reality application 120. Using the visual data, digital funds placement application 140 may determine particular identifying characteristics with the object or environment to identify that object or environment to other devices capturing the scene. In some embodiments, this may include detecting a geo-location, determining a time of placement of the digital funds, and/or determining a specific visual mark or identifying feature of the object or environment that can be detected in other images or video. The identifying characteristic may be selected by client device 110 and/or may further include data for an amount of digital funds to be placed in the environment. The offer may include selections of data or other options for generation of a virtual graphic or visual indicator for the offer to be displayed with the object in the augmented reality experience. After generating the virtual graphic, digital funds placement application 140 may then store the digital funds amount, virtual graphic, and other data with the identifying characteristic so that the virtual graphic and fund retrieval details, including a required task for completion, may be displayed in the augmented reality experience to other devices when capturing the object by those other devices. Digital funds placement application 140 may retrieve the funds from an account belonging to the user placing the funds and hold those funds in another account or process, such as an escrow account, for a period of time that the virtual graphic and funds placement is valid.

Digital funds placement application 140 may later receive additional visual data that captures the object and/or environment. For example, client device 110 or a similar device may execute augmented reality application 120 (or a corresponding application) to capture visual data of a real-world scene. Digital funds placement application 140 may process the visual data to determine whether the visual data includes one or more identifying characteristics that match the previously stored identifying characteristics. For example, a geo-location for the newly captured visual data may be compared to past geo-locations for the placement of funds or if identifying characteristics are detected in the scene. If a match occurs, then digital funds placement application 140 may display the virtual graphic or visual indicator having the offer details through the augmented reality experience capturing the new visual data of the real-world scene. This may include overlaying graphics, adjusting visual parameters of the scene, or otherwise presenting augmented reality details with the real-world images of the object. Additionally, the virtual object may only be displayed to authorized users or digital funds placement application 140 may determine if the retrieving user is authorized to receive the funds. This may include determining the retrieving user's proximity the placing user, using a social graph between the users, determining a connection of the retrieving user to the geo-location of the digital funds (e.g., whether the retrieving user is an employee at the geo-location), determining an identity of the retrieving user, or otherwise authenticating the retrieving user and determining the retrieving user as being an authorized user.

Transaction processing application 132 may correspond to one or more processes to execute modules and associated specialized hardware of transaction processor server 130 to process a transaction, including placing and associating an amount of digital funds with an environment in an augmented reality experience. In this regard, transaction processing application 132 may correspond to specialized hardware and/or software used by a user associated with client device 110 to establish a payment account with transaction processing application 132 by providing personal and/or financial information to transaction processor server 130 and selecting authentication credentials. In various embodiments, the financial information may include payment instrument information, such as account/card numbers and information. The account may be used to send and receive payments, including those payments that may be left in an augmented reality experience for a real-world environment or object for retrieval by another user. The payment account may be accessed and/or used through a browser application and/or dedicated payment application executed by client device 110, such as transaction application 112.

In some embodiments, client device 110 may generate a request to place an amount of funds with a real-world object environment based on a virtual graphic or indicator, which may include rules for retrieval by a specific user, a group or type of user, and/or based on completion of a task to release the funds. Thus, transaction processing application 132 may interact with client device 110 to generate and process the transaction data for placement of funds in an augmented reality experience, which may include interacting with another device or account to release the funds to an account of another user. Transaction processing application 132 may receive a placement and/or redemption request of funds from a virtual graphic in the augmented reality experience, which may include identifiers, tokens, or other data used for transaction processing. Transaction processing application 132 may process a payment and may provide a transaction history to client device 110 and/or another user's device or account for transaction authorization, approval, or denial of the transaction for placement and/or release of the funds, including transfer of the funds between accounts.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. The user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from client device 110, one or more digital wallets and/or payment accounts belonging to the users may be found. Database 136 may store augmented reality data for an augmented reality experience that may be displayed to other devices, including object recognition data, identifying characteristics of objects and/or environment for object identification and recognition, virtual graphics and/or visual indicators for funding placements in environments, and information for release of the funds, such as authorized user information, tasks required to be completed for fund retrieval, and other information.

In various embodiments, transaction processor server 130 includes at least one network interface component 138 adapted to communicate client device 110 and/or another device or server over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
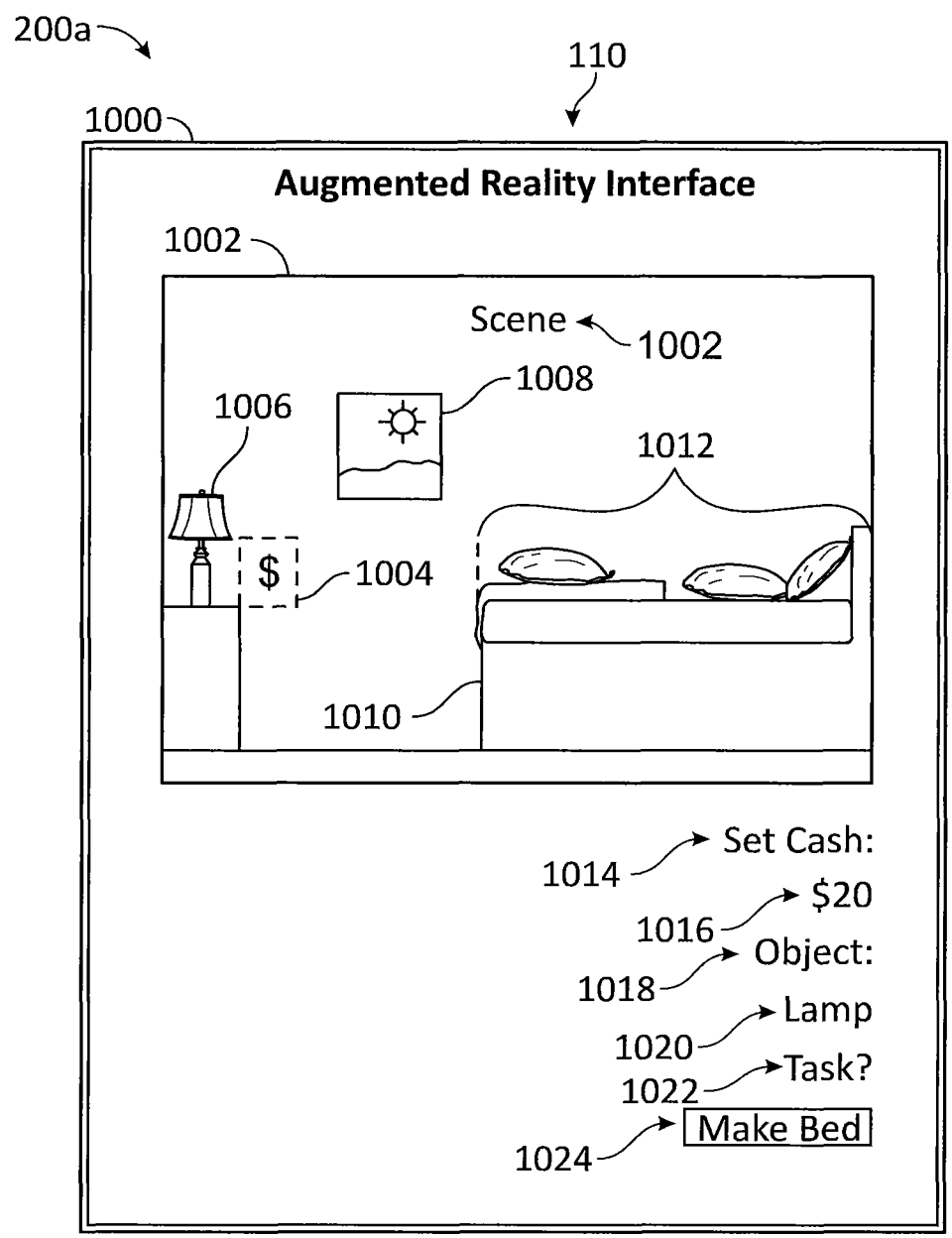
FIG. 2A is an exemplary interface of a communication device displaying an augmented reality experience where a user may place a virtual object for redemption of funds associated with a real-world object, according to an embodiment.

FIG. 2A is an exemplary interface of a communication device displaying an augmented reality experience where a user may place a virtual object for redemption of funds associated with a real-world object, according to an embodiment. Environment 200a of FIG. 2A includes an augmented reality interface 1000 of client device 110, for example, corresponding generally to an interface output through the described features, processes, and components of augmented reality application 120 of client device 110 in system 100 of FIG. 1. In this regard, a user utilizing client device 110 may view augmented reality interface 1000 on client device 110, where augmented reality interface 1000 corresponds to an interface displaying an augmented reality experience, scene, or other data determined and generated by augmented reality application 120.

In this regard, augmented reality interface 1000 includes an augmented reality display of a scene 1002 captured of a real-world environment that may then be displayed with augmented reality data for an augmented reality application and experience on client device 110. For example, a scene 1002 may display real-world data for an environment, as well as virtual graphics and visual identifiers overlaid or added to visual data for the real-world environment. Those virtual graphics, objects, or indicators may correspond to placement of digital funds for an amount that may be collected by another user, such as a specific authorized user or group of users and/or based on the user or group completing a task. For example, a first user may wish to leave a tip for a service staff member at a business to collect when that service staff member provides some service or next visits the location of placement of the digital funds in the augmented reality experience.

In order to accurately determine the location for placement of funds in the augmented reality experience (e.g., the corresponding real-world location, environment, or object associated with the funds), one or more identifying characteristics of the environment may be required to be determined, including a geo-location, a time of capture of the environment and/or placement of the funds, and/or objects in the environment (including a specific object that the funds may be attached to, which may be static or mobile). Thus, in scene 1002, a virtual object 1004 is shown for placement of digital funds that may be retrieved and collected by another. To identify the environment and show virtual object 1004 to other users with scene 1002, a lamp 1006, a painting 1008, and/or a bed 1010 may be used, separately or collectively, to identify the environment, including colors, shapes, markings, and other identifying features of each of lamp 1006, painting 1008, and/or bed 1010. Using a set cash option 1014, an amount 1016 may be associated with virtual object 1004 for redemption by another. A geo-location of client device 110 may also be detected when setting the digital funds in scene 1002 so that the geo-location may also be associated with virtual object 1004.

Further, the user viewing scene to set amount 1016 with virtual object 1004 may attach virtual object 1004 to a real-world object, such as lamp 1005, so that virtual object 1004 is shown in proximity to, on, or located with the real-world object. This may provide additional context to virtual object 1004, such as a required task. Thus, object selection option 1018 may allow for the user to make lamp selection 1020 of the associated real-world object. When establishing amount 1016 for virtual object 1004, the user may further establish a task 1022 for real-world objects to be completed, adjusted, or otherwise changed before release and redemption of amount 1016. For example, scene 1002 shows bed 1010 having an unmade status 1012, where pillows and blankets on bed 1010 are not organized. Thus, with task 1022, a task request 1024 shows a required task to be completed for release of amount 1016 for virtual object 1004 as "make bed." As a result, another user is aware of what task to complete for release of the funds and the augmented reality experience can monitor for completion of that task.

Figure 2B:
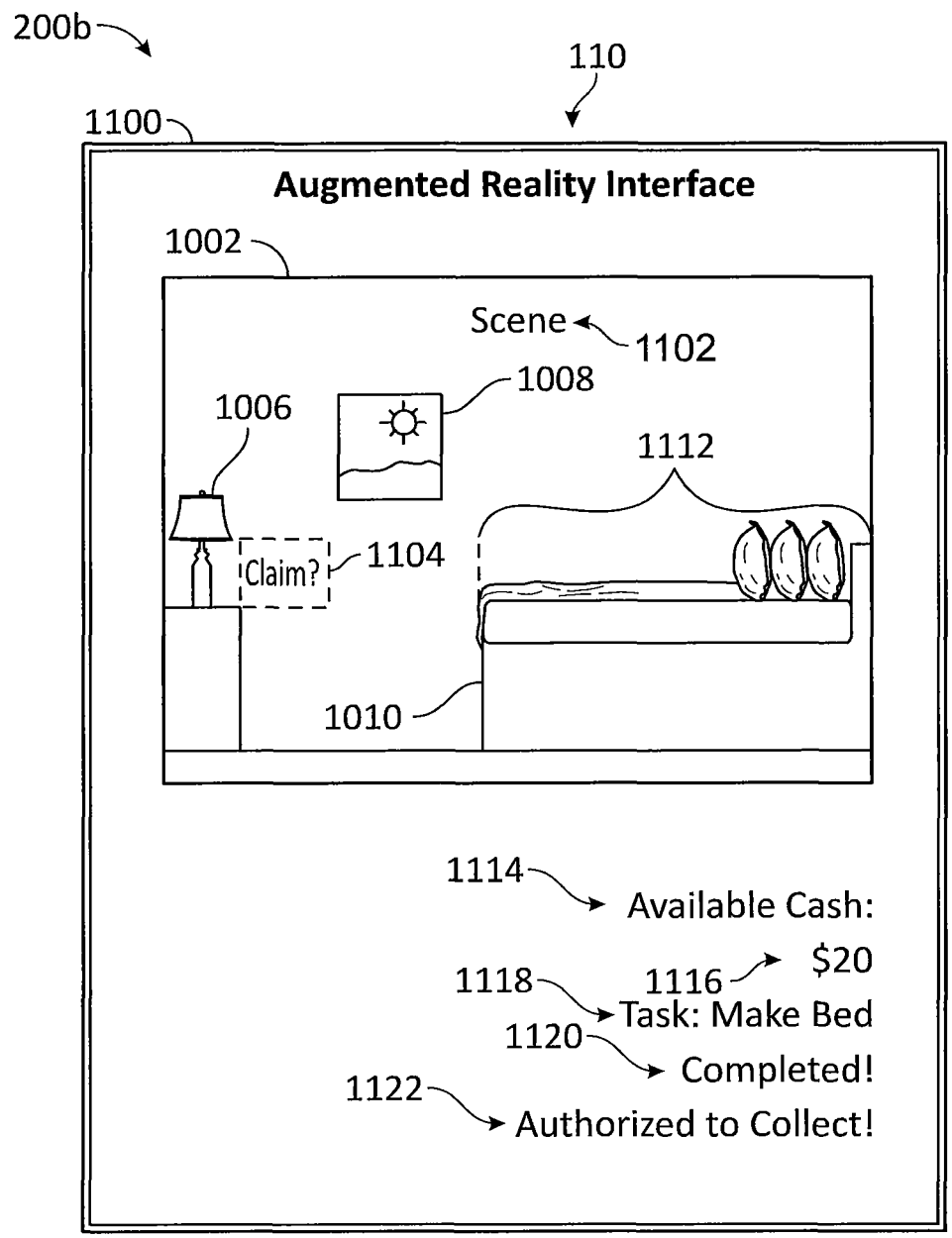
FIG. 2B is an exemplary interface of a communication device displaying an augmented reality experience having a virtual object associated with redeemable funds, according to an embodiment.

FIG. 2B is an exemplary interface of a communication device displaying an augmented reality experience having a virtual object associated with redeemable funds, according to an embodiment. Environment 200b of FIG. 2B includes an augmented reality interface 1100 of client device 110, for example, corresponding generally to an interface output through the described features, processes, and components of augmented reality application 120 of client device 110 in system 100 of FIG. 1. In this regard, a user utilizing client device 110 may view augmented reality interface 1100 on client device 110, where augmented reality interface 1100 corresponds to an interface displaying an augmented reality experience, scene, or other data determined and generated by augmented reality application 120.

Augmented reality interface 1100 displays an augmented reality display 1102 that displays augmented reality data for an augmented reality application and experience. For example, a scene 1102 may display real-world data for an environment, as well virtual graphics and visual identifiers overlaid or added to visual data for the real-world environment. In this regard, scene 1102 displays a real-world environment having virtual objects added for placement of funds that may be redeemed and collected by another, such as an authorized user and/or based on the user completing a task. In order to place virtual objects within scene 1104, the real-world environment corresponding to scene 1104 may be required to be identified so that the corresponding virtual objects may be looked up in a referential database and retrieved. This may be done through identifying characteristic of scene 1104, including the real-world objects in scene 1104, a geo-location of scene 1104, and a time of placement and/or generation of the virtual objects and/or digital funds in the augmented reality experience corresponding to scene 1102.

To place virtual object 1104 in scene 1102, lamp 1006, painting 1008, and bed 1010 may each be identified in scene 1102, which corresponds to the same or similar objects from scene 1002 of environment 200a for FIG. 2B. Moreover, the geo-location of client device 110 when viewing scene 1102 may also be used to determine which virtual objects are associated with that location and populate those virtual objects. Utilizing a combination of real-world objects and geo-location data, the virtual objects may be placed more accurately within scene 1102. Once virtual object 1104 has been retrieved, which may correspond to the same virtual object as virtual object 1004 from environment 200a or a similar virtual object that has been updated for viewing by another user, virtual object 1104 may be displayed in scene 1102. Further, virtual object 1104 is shown next to the associated object, lamp 1006. However, prior to showing virtual object 1104, it may be required to determine whether virtual object 1104 is still valid, such as if it has not exceeded a validity time period and become expired. In such cases where virtual object 1104 has expired, it may not be shown, and the funds may revert to the account of the placing user.

In order to collect the associated funds from virtual object 1104, the user viewing scene 1102 on client device 110 may be required to be authenticated as an authorized user to receive the funds and/or the user may be required to complete a task and show the completion in scene 1102 (e.g., so an application or service provider may determine the task is completed). In augmented reality interface 1100, the user may also view available cash 1114 having an amount 1116 of $40. Additionally, the user may view a required task 1118 shown as "Make Bed." As shown in scene 1100, bed 1010 now is shown with a made bed status 1112 where the blankets and pillows have been cleaned and organized. Thus, task status 1120 shows the task as "Completed," and collection status 1122 for virtual object 1104 shows "Authorized to collect!" Collection status 1122 may also depend on authenticating the user as authorized to collect the funds, such as by determining whether the user's proximity to the placing user, employment status or other user information corresponds to required task 1118, or otherwise verifying that the user may collect the corresponding funds.

Figure 3:
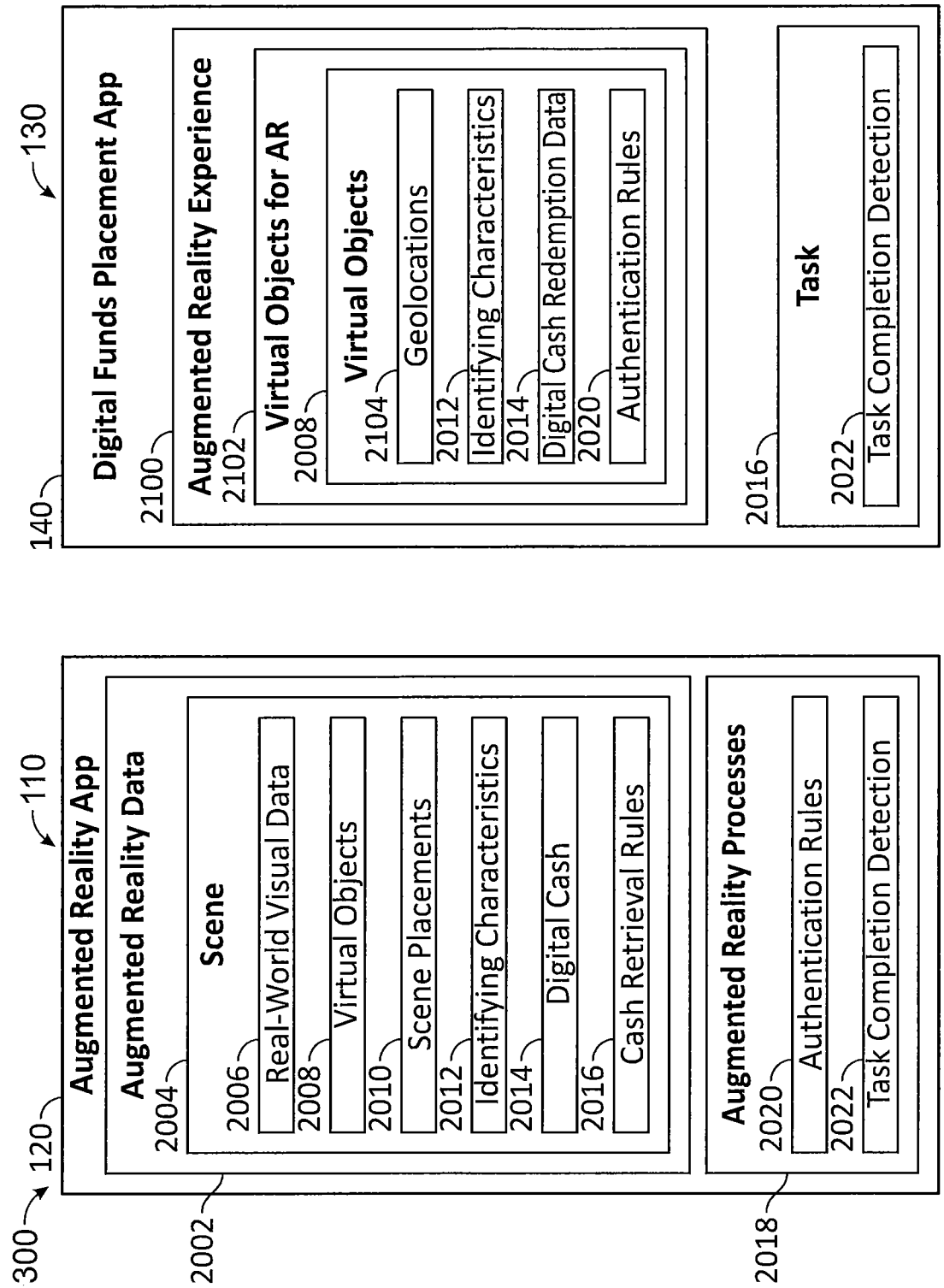
FIG. 3 is an exemplary system environment showing a communication device and a service provider server interacting to provide an augmented reality experience to provide funds through virtual objects or visual indicators in the augmented reality experience, according to an embodiment.

FIG. 3 is an exemplary system environment showing a communication device and a service provider server interacting to provide an augmented reality experience to provide funds through virtual objects or visual indicators in the augmented reality experience, according to an embodiment. Environment 300 of FIG. 3 includes client device 110 and transaction processor server 130 discussed in reference to system 100 of FIG. 1.

Client device 110 includes augmented reality application 120 corresponding generally to the processes and features discussed in reference to augmented reality application 120 in system 100 of FIG. 1. In this regard, augmented reality application 120 includes captured audio, video, and/or audiovisual data, as well as information processed from such data, such as real-world data and virtual data that may be utilized for an augmented reality experience viewed through an application device. For example, augmented reality application 120 may include augmented reality data 2002 for a specific scene viewed through a camera or other optical capture device of client device 110. Augmented reality data 2002 includes a scene 2004 having real-world visual data 2006 captured through that camera or other visual capture component. To create an augmented reality experience, real-world visual data 2006 may be altered with virtual objects 2008, which may correspond to overlays, visual indicators, or other alterations to a visual output of data through a graphical user interface of a device. Thus, one or more images or videos for a real-world scene or environment may be altered using virtual objects 2008.

Virtual objects 2008 may also include data utilized to determine a placement of such data within scene 2004. For example, virtual objects 2008 may include scene placements 2010, which correspond to the necessary data to place one or more virtual graphics within a scene. Identifying characteristics 2012 may be utilized to identify a real-world object within real-world visual data 2006. This may include geo-locations, time stamps, identifying visual marks, or other data that allows association with a specific object, or a class of objects, within an augmented reality experience. Each of virtual objects 2008 may also be associated with digital cash 2014 that may be tied to virtual objects 2008 and redeemed through virtual objects 2008 when viewed within an augmented reality experience. This may correspond to funds placed and/or collected by the user using client device 110.

With digital cash 2014, cash retrieval rules 2016 may also be utilized to set required conditions on releasing digital cash 2014 to one or more users. For example, cash retrieval rules 2016 may correspond to time limits or requirement for retrieval of digital cash 2014 and/or completion of a task, a task for completion, and/or authorized users or identities to receive digital cash 2014. Once an augmented reality experience is displayed, augmented reality processes 2018 may also be used with the augmented reality experience to receive digital cash 2014 with cash retrieval rules 2016. For example, authentication rules 2020 may be used to determine whether a user viewing virtual objects 2008 is authorized to receive digital cash 2014, such as based on an identity, employment status, completed work, location, and the like. Task completion detection 2022 may also be used to determine whether the required task has been completed, for example, by using object or image recognition processes to detect whether an object is present, not present, and/or changes in a scene. A completion state image may also be used to detect the completion of a task.

Transaction processor server 130 includes digital funds placement application 140 corresponding generally to the processes and features discussed in reference to digital funds placement application 140 in system 100 of FIG. 1. In this regard, digital funds placement application 140 may be used to provide visual tags, virtual graphics, or other data within an augmented reality experience, which may be used to place and redeem digital funds through an augmented reality experience. For example, digital funds placement application 140 may include an augmented reality experience 2100, which may track augmented reality data between multiple devices. Augmented reality experience 2100 may include virtual graphics for augmented realities 2102, which includes those virtual objects 2008 that may be added to a real-world scene capture by a device. Further, virtual objects 2008 may be associated with geolocations 2104, identifying characteristics, 2012, and/or digital cash redemption data 2014 that may be added to a scene of a real-world environment captured by a device to create the augmented reality experience that allows placement and collection of digital funds. In order to determine whether a user is authorized to receive the digital funds from one of virtual objects 2008, authentication rules 2020 may be associated with the digital cash redemption data 2014. Moreover, tasks 2016 may be set for virtual objects 2008, which may be monitored for completion using task completion data 2022.

Figure 4:
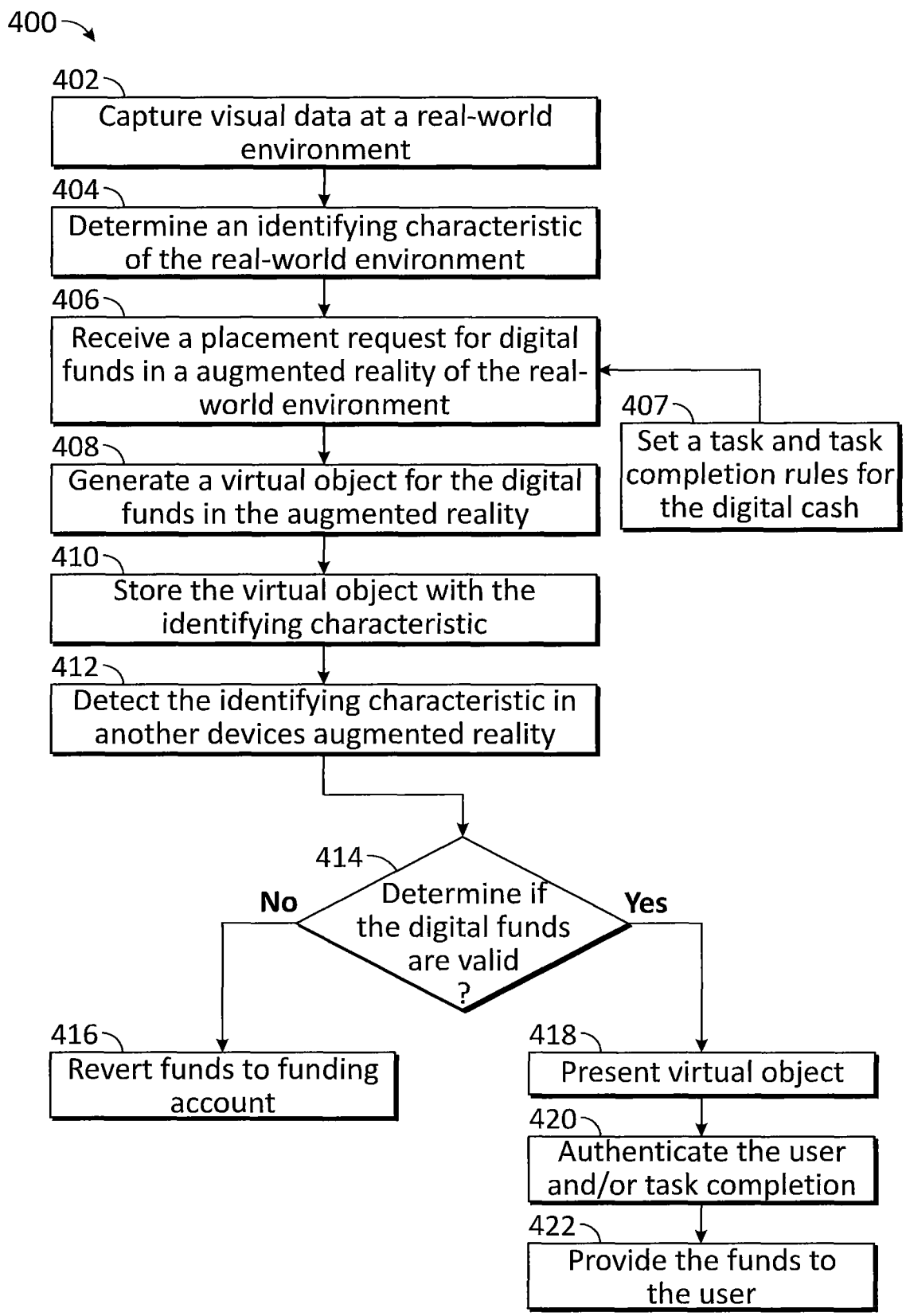
FIG. 4 is a flowchart of an exemplary process for securing virtual objects tracked in an augmented reality experience between multiple devices, according to an embodiment.

FIG. 4 is a flowchart of an exemplary process for securing virtual objects tracked in an augmented reality experience between multiple devices, according to an embodiment. Note that one or more steps, processes, and methods described herein may be omitted, performed in a different sequence, or combined as desired or appropriate.

At step 402 of flowchart 400, visual data of a real-world environment is captured, where the visual data may correspond to images, video, and/or a scan of a real-world environment having one or more objects or features that may be used for identification of the environment. This may be captured by a user's device, such as a mobile phone, wearable computing device, camera, or the like that includes an optical capture device. Additionally, an application, such as an augmented reality application, may be used to capture the environment, which then is further used to alter an output of the environment so that virtual graphics and visual indicators may be displayed with the visual data. At step 404, the real-world environment and an identifying characteristic of the environment are determined in the visual data, for example, through object recognition processes, geo-location, and/or time of visual data capture. The real-world environment may be identified using object recognitions processes, which may identify objects and features based on visual points, marks, or other information in the visual data. For example, a house, vehicle, furniture, or personal item in real-world data of the environment may include various detectable features. Further, the identifying characteristic, including a location, mark, feature, time of capture, or other information also may be used.

In order to place funds within an augmented reality experience so that other users may retrieve and collect those funds through the augmented reality experience, at step 406 of flowchart 400, a placement request for digital funds in an augmented reality of the real-world environment is received. The placement may correspond to an operation performed by the user of the device to request that a virtual object be generated so that it is viewable by others and an authorized user may receive the funds. In some embodiments, the user may select a sub-location or area of the scene in the augmented reality experience or may more generally just request the placement of the virtual object and funds. Moreover, prior to generating the virtual object, the user may also set a task and task completion rules for the digital cash, at step 407, where the task must be completed based on the rules prior to providing the cash. At step 408, the virtual object for the digital funds in the augmented reality is generated. Generating the virtual object may include creating some feature, graphic, or visual indicator for the augmented reality experience that can be displayed by other devices in the augmented reality experience based on detected the identifying characteristic. Once created, the virtual object is stored with the identifying characteristic, at step 410.

Thereafter, at step 412 of flowchart 400, the identifying characteristic is detected and/or identified in another device's augmented reality experience, such as through an application capturing a scene for an augmented reality experience on the other device. Another user's device may be used to image, video, or scan the same or similar scene, where the device's augmented reality application and/or a service provider may identify the identifying characteristics in that scene (or associated with the captured event, such as a geo-location and/or time) so that the digital funds and virtual objects for that scene can be retrieved. Based on detecting the identifying characteristic, it is determined if the digital funds are valid, at step 414, such as if they have not expired based on a time period, been redeemed by another, or been canceled by the placing user and placed back in the placing user's account. If those digital funds are not valid, at step 416 the funds are reverted to the funding account if those funds are being held from the funding account. However, in other embodiments, the funds may not be held from the funding account and the placement request or offer for the amount may instead be canceled so the funds cannot be withdrawn from the funding account.

However, if at step 414 the digital funds are still valid, then at step 418 of flowchart 400, the virtual object is presented in the augmented reality experience of the other device currently capturing the scene through an optical capture device and application. This may include overlaying the virtual object onto real-world images or video. Additional information may also be displayed, such as authorized users that may receive the digital funds, as well as a task required to be completed to receive the funds. At step 420, the user of the other device is authenticated, and/or the task completion is monitored and detected. This may require determining user information for the user and comparing that user information to authorized user information and/or preferences for users that are allowed to receive the funds. The task completion may be detected through imaging the environment and detecting changes to objects. If authenticated, then at step 422 the funds are provided to the user. This may include providing the funds into an account of the user from an escrow account holding the funds or from the funding user's account. Additionally, the funding user may be alerted of the digital funds retrieval.

Figure 5:
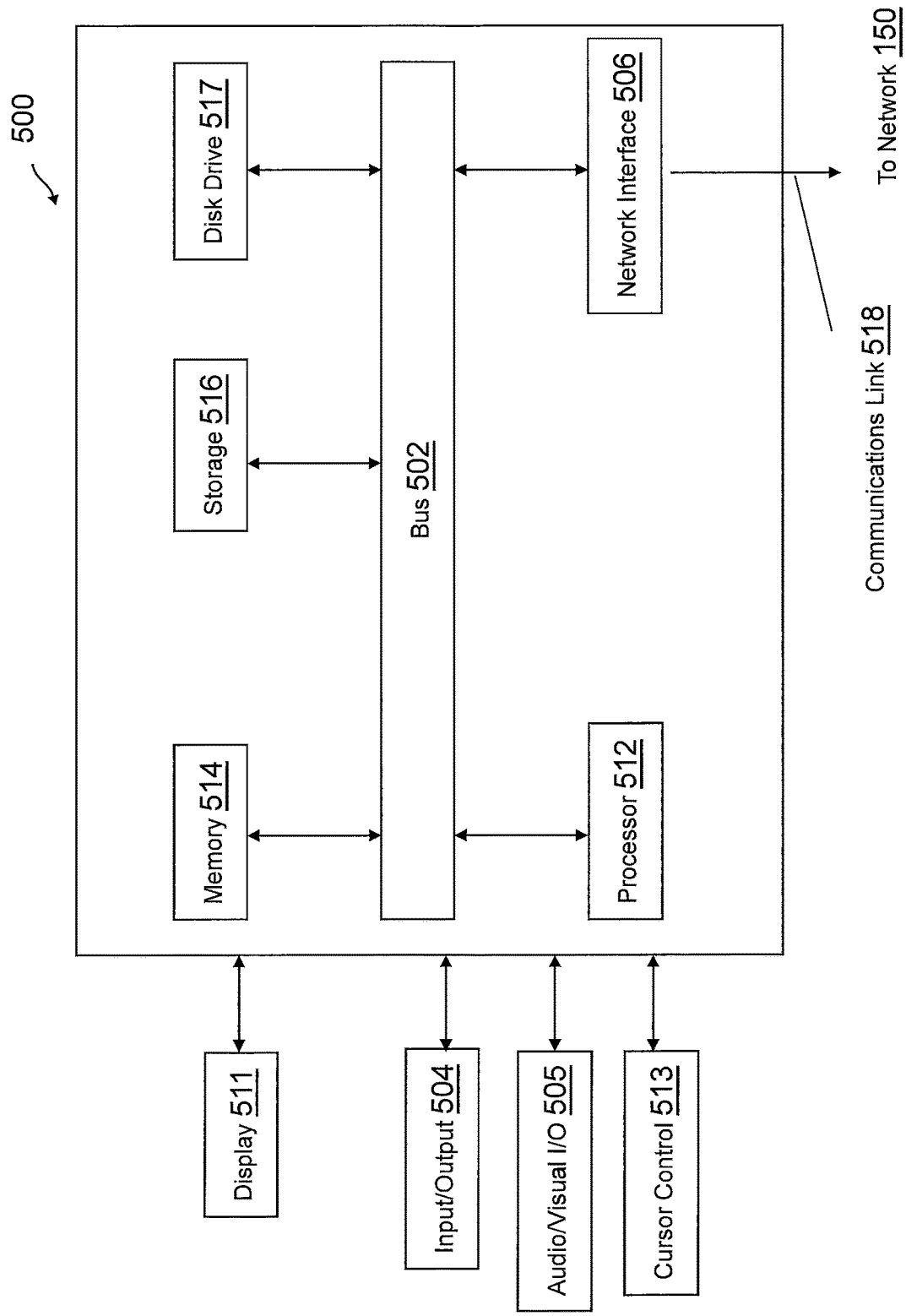
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:

a non-transitory memory; and one or more hardware processors coupled to the non-transitory memory and configured to read instructions from the non-transitory memory to cause the system to perform operations comprising:

receiving, from a first account, a request to place a virtual object in a real-world environment captured in an augmented reality experience as first image data by a first device, the virtual object having a set of associated task rules for interaction with the virtual object via the augmented reality experience;

generating the virtual object for presentment in the augmented reality experience;

detecting, from second image data of the real-world environment captured by a second account using an application for the augmented reality experience operating on a second device, identifying characteristics that indicate the second image data is related to the first image date;

determining, for the second account, that the virtual object and the set of associated task rules is displayable on the second device in the augmented reality experience through the application;

determining, for the application on the second device, a placement of the virtual object in the augmented reality experience relative to a location of the second device in the real-world environment based on the second image data having the real-world environment captured by the second device and the identifying characteristics;

presenting the virtual object for viewing in the augmented reality experience by the second device based on the determining that the virtual object is displayable on the second device and the placement;

determining that the set of associated task rules have been fulfilled; and permitting, in response to determining that the set of associated task rules have been fulfilled, the second account to interact with the virtual object on the second device.

2. The system of claim 1, wherein the virtual object is associated with an amount of monetary funds provided by the first account to be retrievable by the second account.

3. The system of claim 2, wherein the set of associated task rules correspond to a specified change in the real-world environment.

4. The system of claim 2, wherein presenting the virtual object for viewing in the augmented reality experience by the second device comprises presenting a requirement for a completion of a task based on the set of associated task rules.

5. The system of claim 3, wherein determining that the set of associated task rules have been fulfilled comprises determining that the specified change in the real-world environment has been detected.

6. The system of claim 5, wherein an interaction by the second account on the second device with the virtual object causes the amount of monetary funds provided by the first account to be transferred to the second account.

7. The system of claim 6, wherein the operations further comprise removing the virtual object from the augmented reality experience in response to the amount of monetary funds provided by the first account being transferred to the second account.

8. The system of claim 1, wherein the operations further comprise
authenticating the second account for an authorization to view the virtual object,
wherein the virtual object is presented for viewing in the augmented reality experience by the second device in response to the authenticating.

9. The system of claim 8, wherein the authenticating is based on at least one of a proximity of the second device to the first device, a social graph connection between the first account and the second account, determining a connection of the second account to a geo-location of the virtual object, an identity associated with the second account, or a login to the second account with an transaction processor associated with a payment to be made in response to a completion of the set of associated task rules.

10. A method comprising:
receiving, from an account operating on a computing device operating an application for an augmented reality, first image data of a real-world environment at a location;
determining, from identifying characteristics of the first image data, that a virtual object is available to be provided for display;
determining that the virtual object and a task is displayable on the computing device in the augmented reality through the application, wherein the task is designated for interaction with the virtual object via the augmented reality;
determining, for the application on the computing device, a placement of the virtual object in the augmented reality relative to a device location of the computing device in the real-world environment based on the first image data having the real-world environment captured by the computing device and the identifying characteristics;
presenting, to the computing device, the virtual object for viewing in an augmented reality based on the determining that the virtual object is displayable on the computing device and the placement, the virtual object including a requirement for a completion of the task;
receiving, from the account operating on the computing device, second image data of the real-world environment at the location;
determining, based on the second image data, the completion of the task; and
transforming, in response to determining the completion of the task, the virtual object on the computing device.

11. The method of claim 10, wherein the account is a first account, and the virtual object is associated with an amount of monetary funds provided by a second account to be retrievable by the first account.

12. The method of claim 11, further comprising transferring, in response to determining the completion of the task, the amount of monetary funds provided by the second account to the first account.

13. The method of claim 11, wherein the completion of the task corresponds to a specified change in the real-world environment.

14. The method of claim 13, wherein determining the completion of the task comprises determining that the specified change in the real-world environment has been detected between the first image data and the second image data.

15. The method of claim 10, wherein transforming the virtual object comprises removing the virtual object from the augmented reality experience.

16. The method of claim 10, wherein the determining that the object is displayable on the computing device is based on an authentication performed on the computing device, and wherein the virtual object is presented for viewing in the augmented reality experience by the computing device in response the authentication.

17. The method of claim 10, wherein the determining that the object is displayable on the computing device based on at least one of a proximity of the second device to the first device, a social graph connection between the first account and the second account, a connection of the second account to a geo-location of the virtual object, an identity associated with the second account, or an authentication of the second account.

18. A non-transitory machine-readable medium having stored thereon machine-readable instructions executable to cause a machine to perform operations comprising:
receiving, from a first account, a request to place a virtual object in a real-world environment captured in an augmented reality experience as first image data by a first device, the virtual object having a set of associated task rules for interaction with the virtual object via the augmented reality experience;
generating the virtual object for presentment in the augmented reality experience;
detecting, from second image data of the real-world environment captured by a second account using an application for the augmented reality experience operating on a second device, identifying characteristics that indicate the second image data is related to the first image date;
determining, for the second account, that the virtual object and the set of associated task rules is displayable on the second device in the augmented reality experience through the application;
determining, for the application on the second device, a placement of the virtual object in the augmented reality experience relative to a location of the second device in the real-world environment based on the second image data having the real-world environment captured by the second device and the identifying characteristics;

presenting the virtual object for viewing in the augmented reality experience by the second device based on the determining that the virtual object is displayable on the second device and the placement;

determining that the set of associated task rules have been fulfilled; and transferring, in response to determining that the set of associated task rules have been fulfilled, an amount of monetary funds provided by the second account to the first account.

19. The non-transitory machine-readable medium of claim 18, wherein determining that the set of associated task rules have been fulfilled comprises determining that a specified change in the real-world environment has been detected.

20. The non-transitory machine-readable medium of claim 18, wherein the determining that the virtual object is displayable on the second device is based on at least one of a proximity of the second device to the first device, a social graph connection between the first account and the second account, determining a connection of the second account to a geo-location of the virtual object, an identity associated with the second account, or an authentication of the second account.

* * * * *